United States Patent

Führmann et al.

[11] 3,844,587
[45] Oct. 29, 1974

[54] RELEASABLE CONNECTION FOR COAXIAL TUBES

[75] Inventors: Siegfried Führmann, Grossburgwedel; Volkwart Harders, Altwarmbuchen; Hartmut Krüger, Vinnhorst; Rudiger Schwenke, Letter, all of Germany

[73] Assignee: Kabel-und Metallwerke Gutehoffnungshutte Aktiengesellschaft, Hannover, Germany

[22] Filed: Mar. 19, 1973

[21] Appl. No.: 342,488

[52] U.S. Cl............... 285/47, 285/55, 285/138, 285/332.3, 285/334.5, 285/349, 285/368, 285/DIG. 4
[51] Int. Cl............................................. F16l 55/00
[58] Field of Search....... 285/45, 47, 138, 149, 332, 285/332.3, 334.5, 349, 351, 363, 368, DIG. 4, 328, DIG. 7, 133 R; 138/109

[56] References Cited
UNITED STATES PATENTS

| | | | |
|---|---|---|---|
| 1,252,888 | 1/1918 | Dorsey............................ | 285/351 X |
| 1,382,245 | 6/1921 | Russell et al........................ | 285/45 |
| 1,726,483 | 8/1929 | Giesler........................ | 285/332.3 X |
| 2,469,851 | 5/1949 | Stecher et al................. | 285/DIG. 7 |
| 2,485,370 | 10/1949 | Dreyer........................... | 285/368 X |
| 3,534,985 | 10/1970 | Kuypers et al................. | 285/138 X |

FOREIGN PATENTS OR APPLICATIONS

| | | | |
|---|---|---|---|
| 1,146,661 | 5/1957 | France.............................. | 285/227 |
| 955,001 | 4/1964 | Great Britain..................... | 138/109 |

*Primary Examiner*—James R. Boler
*Assistant Examiner*—Moshe I. Cohen
*Attorney, Agent, or Firm*—Ralf H. Siegemund

[57] ABSTRACT

Disclosed is a structure for connecting the ends of a pair of coaxial corrugated tubes to a connecting member by means of a releasable bolt joint wherein an end portion of the inner tube is free from corrugation and sandwiched in between an annulus inside of the inner tube and a flange member that has been threaded into the helical corrugation of the outer tube. The latter flange member has a recess with a sealing ring for sealing against the uncorrugated portion of the inner tube from the outside as well as against the annulus around the axial end piece, or a separate seal is provided between inner tube and annulus.

6 Claims, 3 Drawing Figures

RELEASABLE CONNECTION FOR COAXIAL TUBES

BACKGROUND OF THE INVENTION

The present invention relates to a releasable connection, such as a bolted joint between the end of a concentric tube system and a connecting structure provided with an aperture for fluid conduction, the tube system being comprised of two coaxial, corrugated tubes. A tube system with releasable bolt joint of this type is, for example, disclosed in U.S. Pat. No. 3,534,985, of common assignee.

The known construction as used to connect two coaxial, corrugated fluid-conducting tubes to a connecting structure, includes a sleeve which is threaded onto the end of the inner one of the two corrugated tubes. The shaft portion of a flange member with T-shaped cross-section is threadably received in the outer one of the tubes in axial engagement with the sleeve for axial positioning relative thereto. The end of the inner tube projects beyond the sleeve in the threaded position, and this projecting end has been upset with regard thereto for an axial section about equal to a complete wavelength of the corrugation pattern. Upon tightening the sleeve against the flange, there is provided watertight sealing of the interior space between the two tubes, which, furthermore, are thermally insulated from each other by a layer of foam rubber, part of which is initially removed from the front end region of the inner tube to enable connection of this end to the joint. The flange member, in turn, is firmly bolted and tightened to the structure to which the tube system is to connect and, upon doing so, the flange member positively urges the end face of the sleeve axially against the upset portion of the inner tube and the latter into positive engagement with the external connecting structure adjacent the fluid conducting aperture thereof. In case of possible unevenness in the joint surfaces, this deficiency is obviated by means of applying soft lead to the uneven surfaces.

However, a disadvantage encountered with the above-described joint construction is that in case tubes of stainless steel are used, corrosion may occur in the crevices in the area of the upset projecting end of the inner tube.

Moreover, the sealing between the inner and outer tube in this joint construction is not satisfactory under all conditions because instances have been discovered where moisture can seep into the space between the two tubes which moisture is subsequently soaked up by the foam rubber thermally insualting the two tubes.

BRIEF STATEMENT OF THE INVENTION

It is an object of the present invention to provide a releasable bolt joint for connecting an inner and an outer corrugated tube to a connecting member or piece in a manner to obviate the above deficiencies.

It is another object of the invention to improve on tube connection joints for concentric corrugated tubes, wherein a flange member is threaded from the inside of the outer tube in to the helical corrugations thereof to the outer tube, and a connecting piece is bolted to that flange member.

In accordance with the preferred embodiment of the invention, it is suggested to flatten an end section of the corrugated inner tube (or not to corrugate it to begin with); an annulus is inserted into the inner tube to bear against the flat portion of the said inner tube from the inside thereof. The said flange element has a surface portion to bear against the inner tube opposite that portion engaged by the annulus, there being a recess with a sealing ring, to effect sealing and sandwiching of the flat tube end between the annulus and the flange element upon bolting the latter to the connecting piece. The annulus and connecting piece are either sealingly interconnected or of integral configuration. Either the sealing ring also engages the annulus beyond the axial end of the inner tube, or an additional sealing ring is interposed between the inner tube and the annulus.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which;

Referring now to the drawings in which like reference numerals index like or comparable parts, FIG. 1 shows an outer corrugated tube 1 coaxially disposed in relation to an inner, likewise, corrugated tube 2. Tube 1 is jacketed in protective insulation cover or jacket 19, which may include a wear resisting coating. Foamed plastic 4 is generally disposed between the two tubes for thermally insulating them. The corrugations of the two tubes 1 and 2 are helical, winding around the tubes to resemble the threading of bolts. However, the corrugations of the inner tube 2 may run parallel to each other, annularly around the tube. These two tubes form a coaxial and concentric tube system which extends generally to the right of FIG. 1 and for a readily selectable length.

Figure 1:
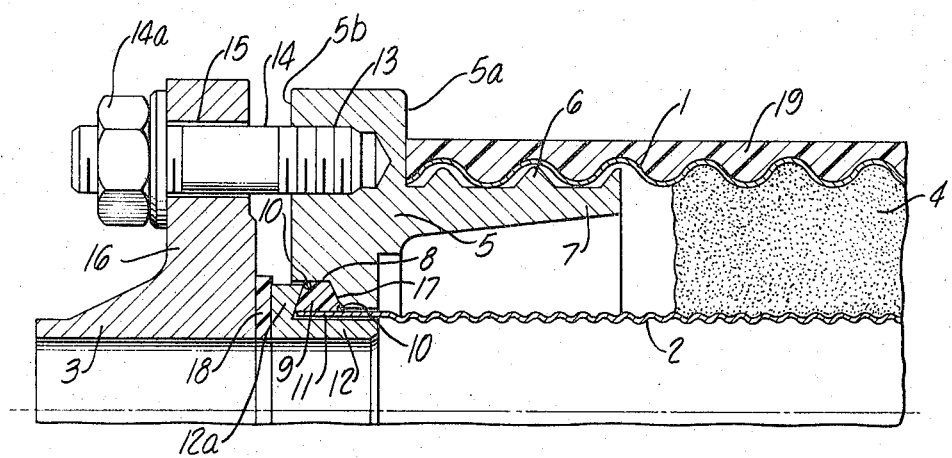
FIG. 1 shows a cross sectional view through an example of a joint constructed in accordance with the preferred embodiment of the invention, illustrating particularly the connection of two coaxial tubes to a connecting piece.

The objective of the system and construction to be described in the following is to provide a fluid-conductive but sealed connection between the tube system, particularly the inner tube 2 thereof, and a connecting piece 3 which may be a part of a branching portion or may serve as connection to a source or destination for fluid as conducted through tube 2.

Assuming tube 1 to have helical corrugation, a flange elements 5 is to be used which is provided with a sleeve 7 being integral therewith having threads 6 around its outer circumference. Thus, flange 5 can be axially threaded into the inner corrugations of the outer tube 1. Accordingly, the flange element 5 is threaded into the tube 1 until flange surface 5a abuts the front end of outer tube 1, as well as the insulation cover or jacket 19 thereon. Threading in this manner permits a tight fit between flange 5 and tube 1. particularly the insulative cover 19 thereon.

The inner periphery of annular flange element 5 is provided with an annular recess 8 surrounding the outer periphery of the end portion 11 of inner tube 2. This end 11 of the inner tube has been flattened (or not corrugated to begin with) and has, therefore, smooth wall and wall surfaces. A sealing ring 9, preferably made of polytetrafluorethylene, is disposed in recess 8 and retained therein by means of a pair of wire rings 10. Particularly, rings 10 prevents material of sealing ring 9 from creeping out of recess 8, as further defined and bounded by flattened tube end 11. The sealing member tightly engages the outer periphery of the end 11 of pipe 2, but permits axial movement relative thereto.

An annulus 12 is axially slidably received and positioned inside of the inner tube so that the cylindrical periphery of annulus 12 bears against the inside of flattened end 11. The main axis of element 12 is coaxial with tubes 1 and 2. Sealing ring 9 urges tube end 11 into flat abutment with said outer periphery of annulus 12. Annulus 12 has a flange 12a which, as to the side facing tube 2, closes the retention space for sealing ring 9 in axial direction. Moreover, flange 12a may serve as abutment for the axial end proper of flattened tube end portion 11.

Flange element 5 has a rather flat annular surface 5b axially facing a similar surface of a flange 16 on connecting piece 3. The flange member 5 is provided with several axially extending threaded bores 13, provided to receive tensioning bolts 14, one being shown in FIG. 1. The plural bores 13 are distributed about the common axis of the system, and plural bolts, such as 14, are provided parallel to this common axis accordingly. As shown, the tensioning bolts 14 extend through bores 15 provided axially through flange ring proper 16 of element 3, without threading.

Upon tightening nuts 14a, flange 16 is urged against the other axial end face of flange 12a which, in turn, forces the end of tube 2 into abutting engagement with the flange portion 12a of annulus 12 on the other side of flange 16. Moreover, sealing member 9 is thereby firmly pressed against and forms a watertight fit with the smooth end 11 of the inner pipe 1, as well as with flange 12a and with flange 5 at its recess 8. This latter sealing function is particularly enhanced by the beveled surface 17 of recess 8, and by the oppositely beveled surface of flange 12a as facing recess 8. With this configuration of recess 8 and of coacting surfaces, a complete sealing effect will be accomplished following tightening of the bolts.

A further annular sealing member 18 is provided between the element 3 and the surface facing flange 12a. To further prevent penetration of moisture between the flange member 5 and the outer pipe 1, a conventional tubular sealing hose, not shown, may be positioned about the flange member 5 and the outer plastic insulation jacket 19.

Figure 2:
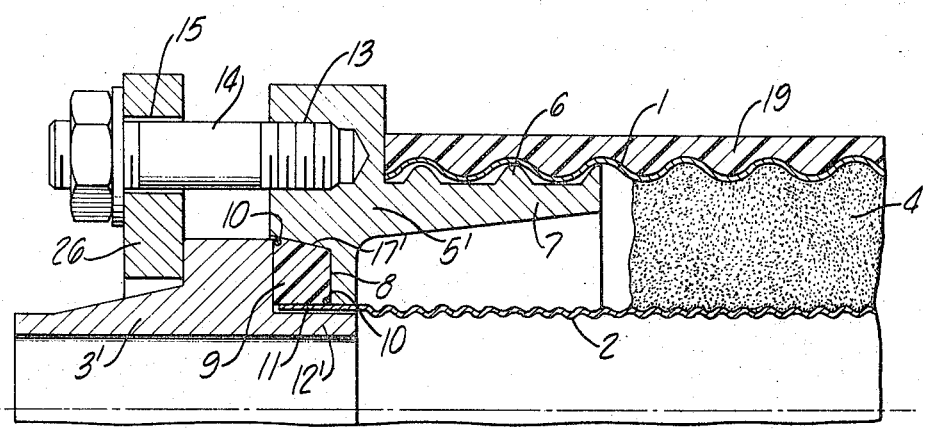
FIG. 2 shows a view similar to that of FIG. 1, however, illustrating a modified connection arrangement according to another example of a joint in accordance with the preferred embodiment of the invention.

FIG. 2 shows an embodiment in which an annulus 12' is integrally formed with connecting element 3', and this axial extension of element 3' replaces annulus 12 of FIG. 1 as a separate piece. The invention generally calls for sealing connection between annulus and connecting piece; this condition is automatically fulfilled when making these two parts of integral configuration. This modification renders the use of annular sealing washer 18 of FIG. 1 unnecessary and, moreover, shortens the assembly time of the joint connection. The other parts remain the same as in FIG. 1, except for the location of a simple bevel surface 17 in this instance.

Another modification of FIG. 2 involves separation of connecting piece 3' from the flange for the tightening bolts. This flange is a separate annulus 26 here, abutting against a short annular flange extending radially outwardly from part of element 3'. This separation could also be practiced in an example where the annulus 12 is a separate element. The trade off here is the use of simpler contoured parts vs. simplified assembly in situ.

Figure 3:
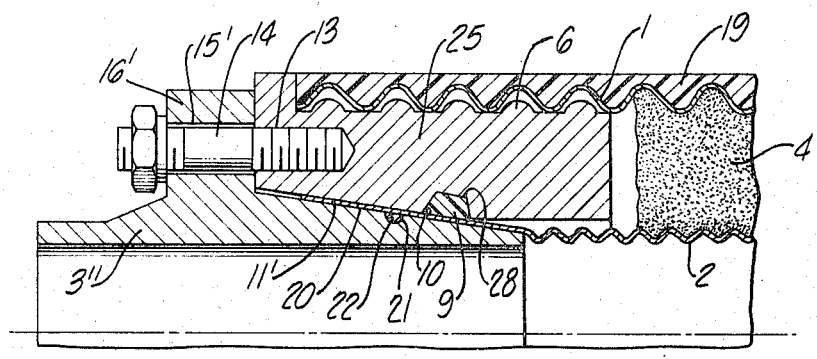
FIG. 3 shows a view similar to that of FIGS. 1 and 2, however, illustrating a still further modified connection arrangement according to a third example of a joint in accordance with the preferred embodiment of the invention.

Proceeding now to the example of the invention, as shown in FIG. 3, the connecting piece 3' is presumed here to have an extension with a conical surface 20. The somewhat differently contoured flange member 25 (replacing flanges 5 and 5' of FIGS. 1 and 2) has a bore with a correspondingly conical inner bore, the apex angles of these two cones are the same. The end 11' of tube 2 is not only flattened, but has been flared. to fit into the conical space between surface 20 and the conical bore of flange 25. Upon tightening bolts 14, the flared and flattened tube end is clamped between the two conical surfaces.

A recess 28 is located in flange 25 to receive sealing ring 9, performing the same function as before. An additional recess 21 is provided in surface 20 to receive another sealing ring 22, pressing against the tube end 11' from the inside.

The sealing members 9, 18 and 22 can be made of a plastically deformable metal, e.g., a lead alloy. However, utilization of polytetrafluoraethylene was found particularly advantageous. The end of any other coaxial tube system may be connected to a similar connecting structure, and the corresponding rigid connecting pieces 3' or 3" are then interconnected, e.g., through welding, or they are already constructed integrally and, e.g., symmetrically, so that the illustration of parts 3, 3', 3" can be interpreted as one-half of a two-tube system connecting structure.

The invention is not limited to the embodiments described above but all changes and modifications thereof not constituting departures from the spirit and scope of the invention are intended to be included.

We claim:

1. In a releasable connection between a coaxial tube system having two corrugated, concentric tubes positioned and retained relative to each other by spacer means, and a connecting piece with a central bore to be aligned with the inner one of the two tubes, at least the outer one having helical corrugation, a flange element having a threaded sleeve portion threaded into the corrugation of the outer tube and being bolted to said connecting piece, the improvement comprising:

an end portion of the inner tube being flat, without corrugation nor outwardly extending flange but having smooth inner and outer surfaces;

an annulus having an outer surface and placed into the inner tube and into abutment with the inner surface of the flat portion thereof;

the flange element having a recess facing the outer surface of the flat end of the inner tube in radial inward direction and adjacent but opposite to the location of abutment of the said annulus with the inner tube;

a sealing ring in said recess in sealing abutment with a flat tube end, so that upon bolting the connecting piece to the flange element under axially directed tension the flat tube is sandwiched between the flange element with sealing ring and the said annulus while the sealing ring is radially compressed against the flat end of the inner tube; and means to sealingly connect the annulus to the connecting piece.

2. The combination as in claim 1, wherein the annulus and the connecting piece are integral, the latter constituting an axial extension of the former and inserted into the inner tube.

3. The combination as in claim 1, wherein at least one surface of the said recess has beveled contour.

4. The combination as in claim 1, wherein the said outer surface of the annulus is cylindrical, there being a radially outwardly extending surface of the annulus serving as stop for the axial end of the inner tube and of the sealing ring.

5. The combination as in claim 1, wherein the outer surface of the annulus is conical, the flange element having a correspondingly mating, conical inner surface provided with the recess, the tube end being conically flared and sandwiched between the said conical surfaces of the annulus and of the flange element.

6. The combination as in claim 1, wherein the annulus has a surface portion extending radially away from the said outer surface, the sealing ring engaging the flange element at the recess, the outer flat end of the inner tube and the surface portion; the sealing ring being axially compressed upon bolting of the connecting piece to the flange element to obtain radial pressure of the sealing ring against the flat tube end.

* * * * *